July 21, 1953   F. G. PELLETT   2,646,183
CONTAINER CLOSURE
Filed Sept. 8, 1950
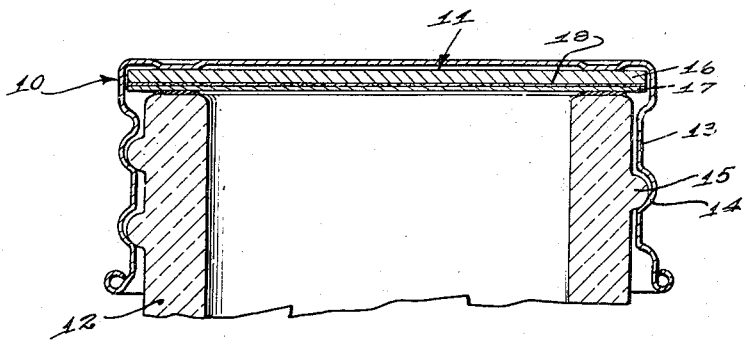
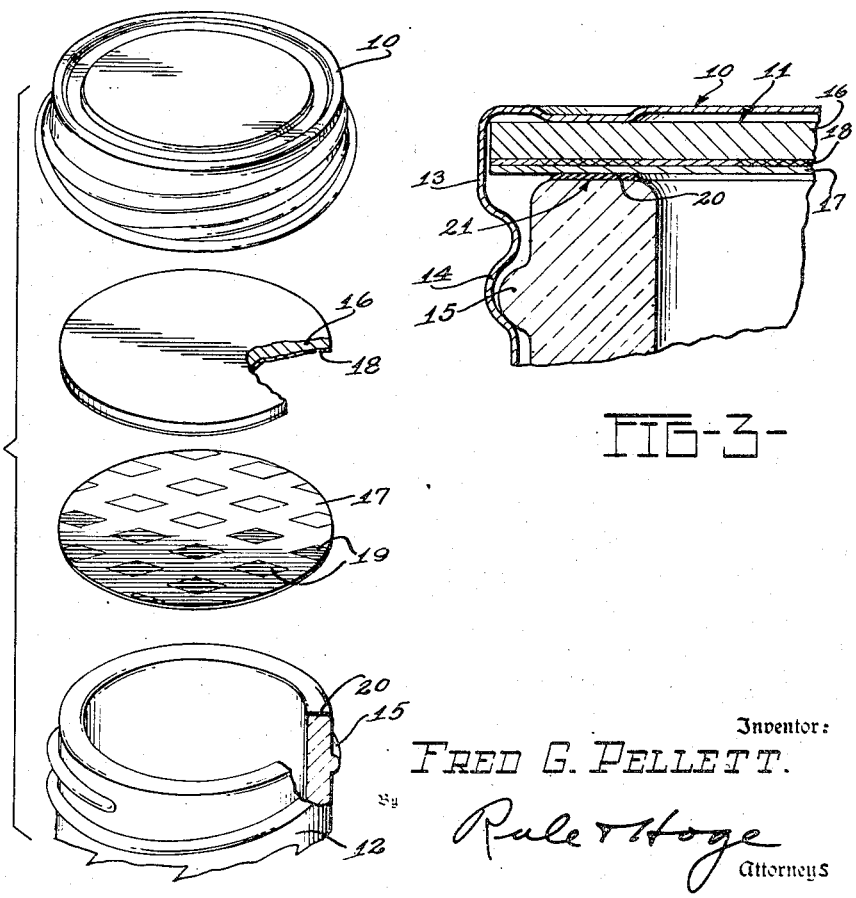
Inventor:
FRED G. PELLETT.
Rule & Hoge
Attorneys Patented July 21, 1953

2,646,183

UNITED STATES PATENT OFFICE 2,646,183

CONTAINER CLOSURE

Fred G. Pellett, Toledo, Ohio, assignor to Owens-Illinois Glass Company, a corporation of Ohio Application September 8, 1950, Serial No. 183,766

1 Claim. (Cl. 215—40)

This invention relates to closures for bottles and jars and more particularly to closure liners including an impervious membrane facing sheet which is intended to remain securely bonded to the sealing surface of a container during and after removal of the closure.

Such a method of sealing is utilized quite extensively in the pharmaceutical and food fields where it is important that the packaged product be protected against the admission of outside air such as would have a deleterious effect upon the product. It is common practice to utilize the combination of a cushion or backing liner disk and a membrane facing sheet or liner, both being placed in a screw-type closure. Sealing of a container with such a closure is effected by applying an adhesive to the sealing surface of the container and then placing the closure upon the latter in the usual manner. Incident to screwing the closure onto the container, the adhesive is spread uniformly over the sealing surface so that it effectively bonds the facing sheet to the container in a fashion that insures maintenance of the seal during and after removal of the closure.

One serious objection to the above structure is that the facing liner is not reliably held in the closure and as a consequence in many instances, falls out incident to general handling, shipment to the packers, or in any event, prior to the application of the closures to the containers. It obviously is impractical to inspect the closures individually at the container sealing station to determine the presence or absence of such facing liners.

An important object of my invention is the provision of novel, simple, and completely reliable means for overcoming the above noted objection. To that end I provide an adhesive connection, or bond, between the facing liner and cushioning liner, or disk, of such degree that they are reliably held assembled during shipment, handling, etc., yet will readily separate incident to removal of the closure from a container. Such functioning is due to the bond between the two liners being much less effective than the degree of adhesion of the facing liner to the glass, yet sufficient to prevent accidental separation of the two liners.

A further object is the provision of a liner of the above character in which the bond between the cushion and facing liners or disks is effected only at a multiplicity of isolated points.

It is also an object to provide such a bond between the cushion and facing liners through the use of a wax film of predetermined tackiness and pattern.

Referring to the accompanying drawings:

Fig. 1 is a sectional view showing my improved closure applied to the neck of a container.

Fig. 2 is an exploded view of the closure, closure liner comprising cushion disk and membrane facing sheet, and container neck, the cushion disk and container being in part section;

Fig. 3 is a fragmentary view of the closure, closure liner, and container similar to Fig. 1 on a greatly enlarged scale.

Referring to Fig. 1, a closure 10 and closure liner 11 are shown in sealing position on a container 12. The closure 10 includes a skirt 13 provided with screw threads 14, the latter performing the two-fold function of holding the liner in the closure and securing the cap to the container. The container has threads 15 formed thereon and adapted to engage with the threads 14 of the closure.

The closure liner 11 comprises a cushion disk 16 and a membrane facing sheet 17. A thin tacky wax film 18 is interposed between the cushion disk 16 and thin membrane facing sheet 17 and serves to adhesively attach them at a multiplicity of isolated points 19. These isolated points of adhesion may be obtained during manufacture by passing the disk and sheet in strip form under a roll as disclosed and claimed in application Ser. No. 197,932, filed November 28, 1950, and now Patent No. 2,584,002, in the names of William Elser and Kenneth L. Richard, entitled Method and Apparatus for Bonding Closure Materials. The liners are then punched or cut out of the laminated strip.

It should be noted that this lamination wherein the cushion disk and membrane facing sheet are bonded or connected at a multiplicity of isolated points, results in a more definite degree of adhesion at the points of contact than would be acceptable over the entire area. There is also less tendency for the membrane to separate when the material is flexed or changed dimensionally due to variations in temperature or humidity.

The liner 11, comprising the two elements 16 and 17, is inserted in the closure as an integral unit. After the container is filled and it is desired to seal the container, an adhesive 20 is applied to the top sealing surface 21 of the container 12 and the closure with liner is then screwed onto the container. An effective seal is thereby provided. When it is desired to remove the contents, the closure is unscrewed and the bond or connection between the cushion disk 16 and membrane facing sheet 17 is thereby broken, leaving the cushion liner in the closure and the facing liner on the container. The membrane facing sheet remains sealed to the neck of the container and must be removed or pierced in order to make the contents available. This result necessarily occurs since the bond between the cushion disk 16 and membrane facing sheet 17 is many times less than that between the membrane facing sheet 17 and the top surface 21 of the container 12.

The cushion disk 16 may be made of any of the usual materials such as, pulp and oil paper, pulp and Vinylite paper, provided that the paper is smooth and non-porous to the extent that a controlled amount of wax may be applied to the surface.

The membrane facing sheet 17 may be made of materials such as, glassine paper, cellophane, saran film or metal foil, dependent upon the type of product being packaged.

The wax film 18 which is interposed between the cushion disk 16 and the membrane facing sheet 17 must be of such a nature that its adhesion can be carefully controlled. I have found, for example, that a suitable wax material can be obtained by mixing highly adhesive petroleum wax and paraffin wax in proper percentages. I have further found that for good results the thickness of this coating must be drastically reduced from the normal 0.001-0.002 of an inch to 0.0001-0.0003 of an inch.

It can thus be seen that the construction described results in a combination wherein the seal or connection between the cushion disk 16 and membrane facing sheet 17 is many times less than that between the membrane facing sheet 17 and the top surface 21 of the container.

Modifications will be resorted to within the spirit and scope of the appended claim.

I claim:

In combination, a container having an annular wall defining an opening and a sealing surface, a closure provided with engaging means, complementary means on the annular wall of the container for engaging the means on said closure, a liner positioned within said closure and comprising a cushion disk, a thin coating of wax constituting a continuous film coating formed on one side of the cushion disk, said coating comprising a mixture of petroleum wax and paraffin wax and having a thickness within the range of 0.0001 to 0.0003 of an inch, a membrane facing sheet positioned over said thin coating of wax and adhered to the disk by isolated areas of the wax coating to form a discontinuous bond between the disk and sheet, the degree of adhesion being only sufficient to hold the disk and sheet against accidental separation, and adhesive means between said sheet and sealing surface securing said sheet to said sealing surface, the adhesive nature of said adhesive means being such that adhesion of the sheet to the said sealing surface is at least several times greater than the adhesion of the sheet to the disk by the wax, whereby when the closure is removed from the container the bond between the cushion disk and the membrane facing sheet is broken and the membrane facing sheet remains sealed to the sealing surface of the container.

FRED G. PELLETT.

References Cited in the file of this patent

UNITED STATES PATENTS

| Number | Name | Date |
|---|---|---|
| 695,273 | Birnie et al. | Mar. 11, 1902 |
| 1,606,307 | Loomis et al. | Nov. 9, 1926 |
| 1,634,073 | Labombarde | June 28, 1927 |
| 1,837,618 | Gutmann | Dec. 22, 1931 |
| 1,966,273 | Waring | July 10, 1934 |
| 1,979,458 | Eisen | Nov. 6, 1934 |
| 2,029,922 | Heckel et al. | Feb. 4, 1936 |
| 2,031,036 | Dreymann | Feb. 18, 1936 |
| 2,077,992 | Eisen | Apr. 20, 1937 |
| 2,359,924 | Leary | Oct. 10, 1944 |
| 2,387,439 | Grabus, Jr., et al. | Oct. 23, 1945 |